United States Patent
Peters et al.

(10) Patent No.: US 10,631,688 B2
(45) Date of Patent: Apr. 28, 2020

(54) GRID FLAP

(71) Applicant: Multipond Wägetechnik GmbH, Waldkraiburg (DE)

(72) Inventors: Andreas Peters, Aschau am Inn (DE); Felix Profe, Winhoring (DE)

(73) Assignee: MULTIPOND WÄGETECHNIK GMBH, Waldkraiburg (DE)

( * ) Notice: Subject to any disclaimer, the term of this patent is extended or adjusted under 35 U.S.C. 154(b) by 0 days.

(21) Appl. No.: 15/963,749

(22) Filed: Apr. 26, 2018

(65) Prior Publication Data

US 2018/0310772 A1 Nov. 1, 2018

(30) Foreign Application Priority Data

Apr. 27, 2017 (DE) .................... 20 2017 002 222 U (51) Int. Cl.
| | |
|---|---|
| *A47J 43/28* | (2006.01) |
| *F16K 1/16* | (2006.01) |
| *G01G 13/16* | (2006.01) |
| *F16S 3/08* | (2006.01) |
| *B65B 39/00* | (2006.01) |

(52) U.S. Cl.
CPC ............ *A47J 43/28* (2013.01); *F16K 1/16* (2013.01); *F16S 3/08* (2013.01); *G01G 13/16* (2013.01); *B65B 39/002* (2013.01)

(58) Field of Classification Search
CPC .... A47J 43/28; F16K 1/16; F16S 3/08; G01G 13/16; B65B 39/002
USPC .................................................. 222/77, 504
See application file for complete search history.

(56) References Cited

U.S. PATENT DOCUMENTS

| | | | | |
|---|---|---|---|---|
| 2,759,411 | A | | 8/1956 | Jenson |
| 3,695,371 | A | * | 10/1972 | Sheetz ...................... B65B 1/32 177/105 |
| 4,005,758 | A | * | 2/1977 | Johnson .................. G01G 3/10 177/196 |
| 4,090,296 | A | * | 5/1978 | Di Piero ................. A47J 25/00 30/113.1 |
| 4,266,691 | A | * | 5/1981 | Wolwowicz ........... G01G 13/08 141/128 |

(Continued)

FOREIGN PATENT DOCUMENTS

| | | |
|---|---|---|
| DE | 34 47 323 A1 | 6/1986 |
| DE | 4333549 A1 | 4/1995 |

(Continued)

OTHER PUBLICATIONS

German Search Report for Application No. DE 20 2017 002 222.2, dated Nov. 28, 2017.

*Primary Examiner* — Paul R Durand
*Assistant Examiner* — Andrew P Bainbridge
(74) *Attorney, Agent, or Firm* — Womble Bond Dickinson (US) LLP; John J. Penny, Jr.

(57) ABSTRACT

The present application deals with a grid flap, comprising a multiplicity of vertical and horizontal grid struts, a frame which surrounds the grid struts, wherein a vertical and a horizontal grid strut respectively overlap in a crossing point, characterized in that the crossing points of the grid struts are made of one piece. As the grid is self-supporting because of its topology (made of one piece) and the overlapping of two grid struts can be avoided, double areas or cavities can be avoided, which contributes to a hygienic design of the grid flap.

10 Claims, 8 Drawing Sheets

(56) References Cited

U.S. PATENT DOCUMENTS

| | | | | |
|---|---|---|---|---|
| 4,660,665 A * | 4/1987 | Powell, Jr. | ............ | G01G 11/003 177/1 |
| 5,734,128 A * | 3/1998 | Gades | ..................... | G01G 17/08 177/132 |
| 5,865,675 A * | 2/1999 | Meester | .................. | A01D 33/10 193/27 |
| 6,748,380 B2 * | 6/2004 | Poole | .................. | G06F 21/6218 707/785 |
| 7,323,643 B2 * | 1/2008 | Hjalmarsson | .......... | B65G 25/02 177/105 |
| 9,296,516 B2 * | 3/2016 | Stahl | .................. | B65D 21/0233 |
| 9,671,026 B2 * | 6/2017 | Peters | .................... | G01G 23/02 |
| 2002/0113043 A1 * | 8/2002 | Cook | .................. | B01D 29/012 219/85.22 |
| 2003/0192487 A1 * | 10/2003 | Zimmerman | ........ | A01K 1/0023 119/842 |
| 2005/0092372 A1 | 5/2005 | Wade | | |
| 2008/0179336 A1 * | 7/2008 | Whitney | .................. | B65D 1/22 220/643 |
| 2010/0186462 A1 * | 7/2010 | Quandt | ................. | D06F 37/262 68/212 |
| 2012/0266436 A1 * | 10/2012 | Rittmann | .................. | E06C 7/14 29/428 |
| 2013/0035032 A1 | 2/2013 | Schneider et al. | | |
| 2014/0048172 A1 * | 2/2014 | Tomioka | ................... | B65B 1/32 141/83 |
| 2014/0097186 A1 * | 4/2014 | Stolzman | ........... | B65D 21/0213 220/494 |
| 2015/0076383 A1 * | 3/2015 | Peters | ................... | G01G 23/02 251/299 |
| 2017/0122791 A1 * | 5/2017 | Giro Amigo | ........ | G01G 19/393 |
| 2018/0310772 A1 * | 11/2018 | Peters | ........................ | F16S 3/08 |
| 2019/0117023 A1 * | 4/2019 | Gandhi | ................... | A47J 43/28 |

FOREIGN PATENT DOCUMENTS

| | | |
|---|---|---|
| DE | 4337631 A1 | 5/1995 |
| DE | 10 2005 014 441 A1 | 11/2006 |
| DE | 10 2007 044 883 A1 | 4/2009 |
| DE | 10 2010 016 505 A1 | 10/2011 |
| EP | 2067425 A1 | 6/2009 |
| EP | 2848903 A1 | 3/2015 |
| GB | 1 477 724 A | 6/1977 |

\* cited by examiner

GRID FLAP

The present application claims priority under 35 U.S.C. § 119 to German Patent Application No. 20 2017 002 222.2 filed on Apr. 27, 2017 in Germany, the disclosure of which is incorporated herein by reference.

The present application relates to a grid flap, for example for the use in the food industry or food processing industry.

Grid flaps are used in the food industry or food processing industry in particular when a very sticky product should be transferred. The adhesion should be minimized by a grid, so that a product can be transferred faster.

Grid flaps according to prior art comprise a frame, a bearing, a connecting structure between the flap and the bearing and a grid. The bearing can be provided as interlocking connection, frictional connection, rotatable connection or rigid connection.

In the prior art, in particular a grid flap is known, for which the wire mesh is welded to the metal frame at the transitions, wherein a metal—metal connection is formed (see EP 2 848 903 A1).

Furthermore, grid flaps with polymer frames and metal grids are known, wherein a metal grid is screwed to the polymer frame or is fused via heating.

For grid flaps in prior art, the area of the grid is furthermore always flat, if the wire mesh is has been automatedly welded to the frame circumferentially. This is the case, as each wire or each strut has to be welded with the frame individually. As this welding process is carried out by a machine, a program has to stop at each welding position, being the reason why it is necessary to design the grid in a flat shape.

For a non-flat frame, however, welding positions can only be reached precisely with very high effort because of the complex geometry and the manufacturing tolerances. The adhesion and the connection of grid and frame can further lead to stability problems. Because of these problems, usual grid flaps can only provide a limited lifetime in the transition between grid and frame, in particular for an impact load or shock load by an impinging product. This is caused by the previous fabrication methods.

The limited lifetime is caused by the following influences:

At first, internal welding stresses can occur, which are generated during the connection of frame and grid. These act in a stability-reducing manner.

Furthermore, stiffness fluctuations can occur because of large changes in the cross-section at connection of the grid wires with the frame, as a large change of the cross-section occurs and the cross-sections are not steady.

Furthermore, the notch effect can further reduce the stability at the grid flap between wire, weld spot and metal frame.

As a cross-section of a wire is locally made smaller when spot-welding, high stresses hence occur, which further reduces the fatigue strength.

Further, an unfavorable flow of forces is present because of the force transmission between wire and metal frame, as for various grid flaps according to the prior art, a mesh is welded on the inner side of a metal frame by a diagonal joint.

Such grid flaps according to prior art usually use a wire mesh of several single wires; for such wire meshes, wires can be moved with respect to each other, although only marginally. A wire mesh hence has a lower stiffness compared to a rigid structure.

In order to prevent a too strong deflection of the mesh, also frames in the range of the mesh on the side opposite to the product are known in the prior art, i.e. as supporting construction for the mesh.

Because of the limited stiffness and the fact that the struts can be moved and are not fixedly connected with each other, it is not possible to provide the wire mesh of a grid flap in a structure which is flat and can be used without supporting construction. Hence, bowed or curved surfaces or free-form surfaces are hardly realizable. For complex geometries, a mesh hence necessarily has to be provided with an additional supporting construction and has to be welded thereto, and because of this required supporting construction on the rear side of the grid, double areas, undercuts and cavities are formed. This counteracts a hygienic design, as a simple and safe cleaning is not possible in this way, and in particular in cavities, the accumulation of dirt, bacteria and cleaner remainders is likely.

It is hence an objective technical problem of the present application to provide a grid flap which has a self-supporting grid without supporting construction and hence fulfils the hygienic requirements in the food industry and food processing industry. Furthermore, it is an objective technical problem of the present application to enable a connection between grid and frame which has a long lifetime in particular for dynamic shock load. Furthermore, it is an objective technical problem of the present application to provide a grid which is dimensionally stable in different geometries.

This objective technical problem is solved with a grid flap with the features of claim 1.

The invention includes a grid flap which has a multiplicity of vertical and horizontal grid struts, which are arranged within a frame. Herein, a vertical and horizontal grid strut, respectively overlap at a crossing point, wherein a crossing point of the grid struts is formed in one piece. At the crossing point, vertical and horizontal grid struts hence are not movable. Further advantageous embodiments are subject-matter of the dependent claims.

A grid flap according to the present invention can be fabricated using very modern production technologies (casting and generative processes like molding, injection molding, 3D-printing, sintering; erosion processes like electric erosion, spark erosion, laser cut-ting, punching out of single cavities). Such production processes are suitable for different metals and polymers.

Hence, it is made possible to fabricate a grid flap consisting of frame and grid structure in one piece, wherein a thus generated grid is self-supporting without providing an supporting construction and can be shaped in every flap geometry, for example in a cylindrical flap shape, free-area shape, but also in the shape of a plane area. It is not necessary to provide a subsequent connection between grid and frame, as both parts of the flap are fabricated from one piece. After fabrication, the grid flap can be treated with stress-free annealing, so that no internal stresses are present any more in the grid struts. As the grid is self-supporting because of its topology (made of one piece) and the overlapping of two grid struts can be avoided, double areas or cavities can be avoided, which contributes to a hygienic design of the grid flap.

In the following, preferred embodiments are explained more in detail with reference to the enclosed figures.

Figure 1:
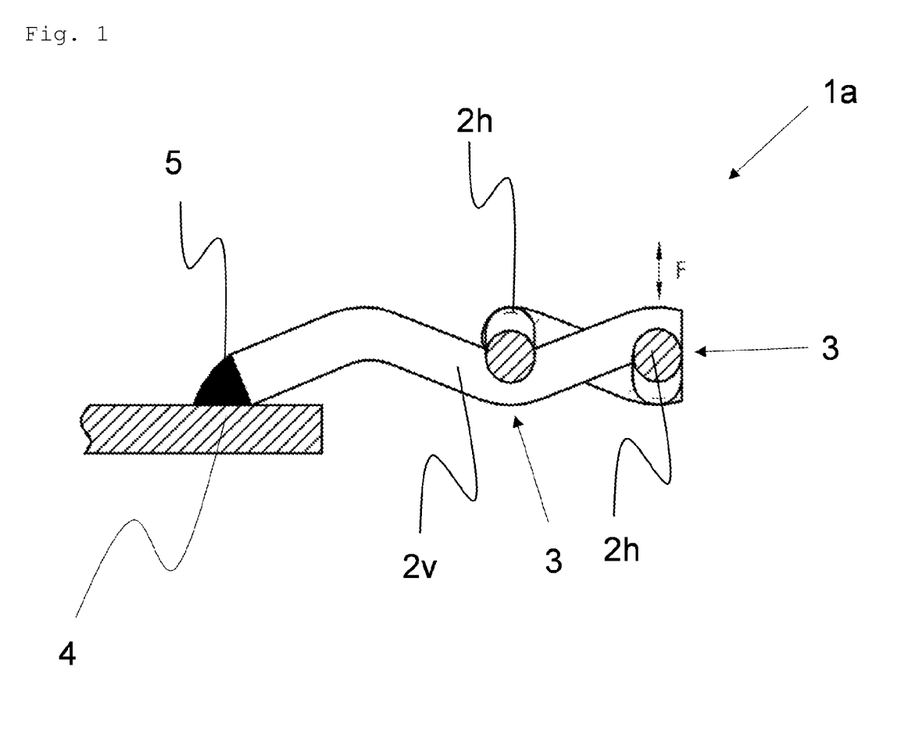
FIG. 1 is a cross-sectional view of a wire netting according to prior art.

In FIG. 1 a cross-sectional view of a grid 1a of a grid flap according to prior art is illustrated. The grid 1a consists of wires 2h and 2v, which are interwoven which each other and hence cohere. At the crossing points 3 of the grid struts 2h and 2v, those grid struts 2h and 2v are not firmly connected with each other. The grid struts 2h and 2v are marginally movable with respect to each other, which leads to a restricted stiffness. Precisely for this reason, an supporting construction (not shown here) is necessary. At the crossing points 3, the grid struts 2h and 2v lie above each other, and precisely because of this lying on each other, a large amount of double areas is present.

In the present example, the welding connection between the grid strut 2v and the frame 4 is provided as a welding seam 5. The welding seam 5 is provided here as inclined joint. If the grid flap or the grid 1a has a changing load because of a force F, there is a stress peak on the inner side of the inclined joint, i.e. of the welding seam 5. The notch effect on the inner side leads to stress peaks at this position.

Figure 2:
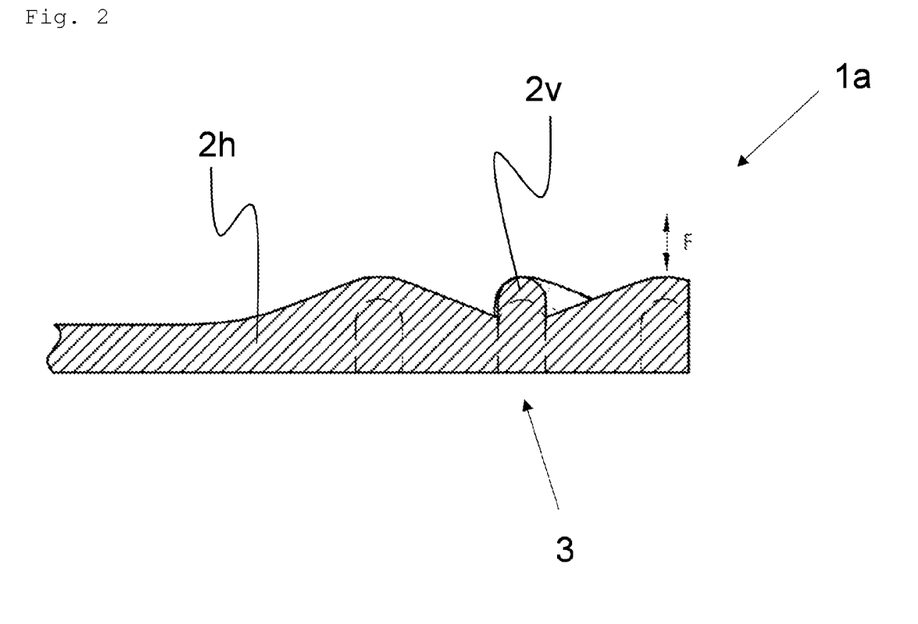
FIG. 2 is a cross-sectional view of a crossing point of a grid structure according to the present invention.

FIG. 2 shows a cross-sectional view of the grid structure 1a according to the present invention. The upper side or the product-conducting side of the grid 1a is similar to the grid of FIG. 1. However, there is the difference compared to FIG. 1, that at the crossing points 3, the wire-like structures 2h and 2v are formed from one piece. Such a design leads to a higher stiffness compared to the usual wire nettings, as e.g. presented in FIG. 1. Furthermore, double areas can be avoided at the crossing points 3. Rather, the rear side of the grid structure 1a is a single area, and this cohering area can be easily cleaned mechanically. The connection of grid 1a and frame 4 is designed as continuous transition, the grid 1a and the frame are flush, similar to a butt joint.

Figure 3:
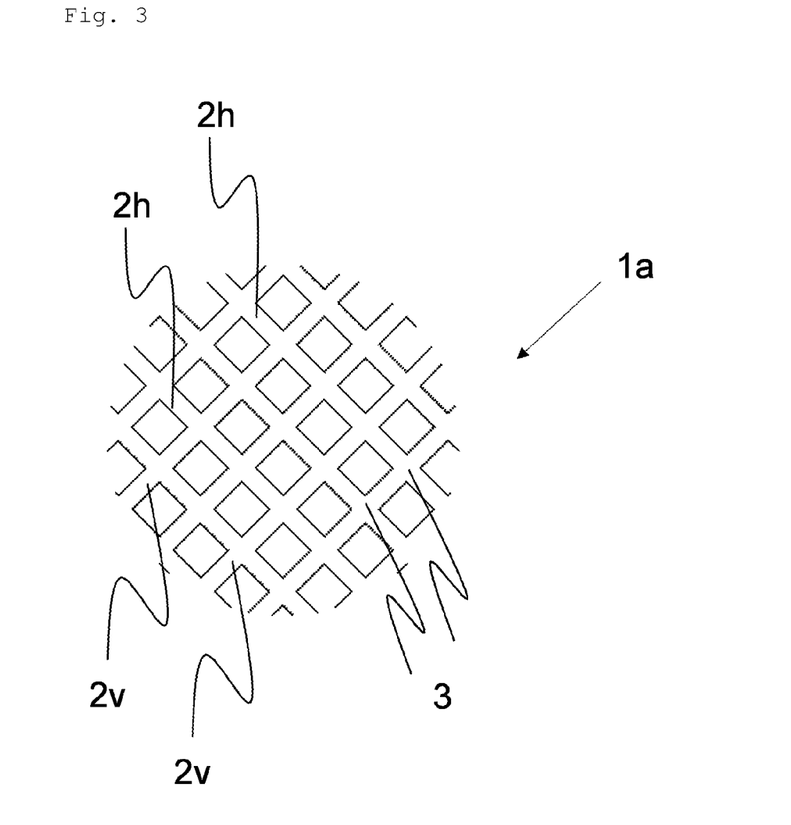
FIG. 3 shows the rear side of a grid structure which contains crossing points according to FIG. 2.
Figure 4:
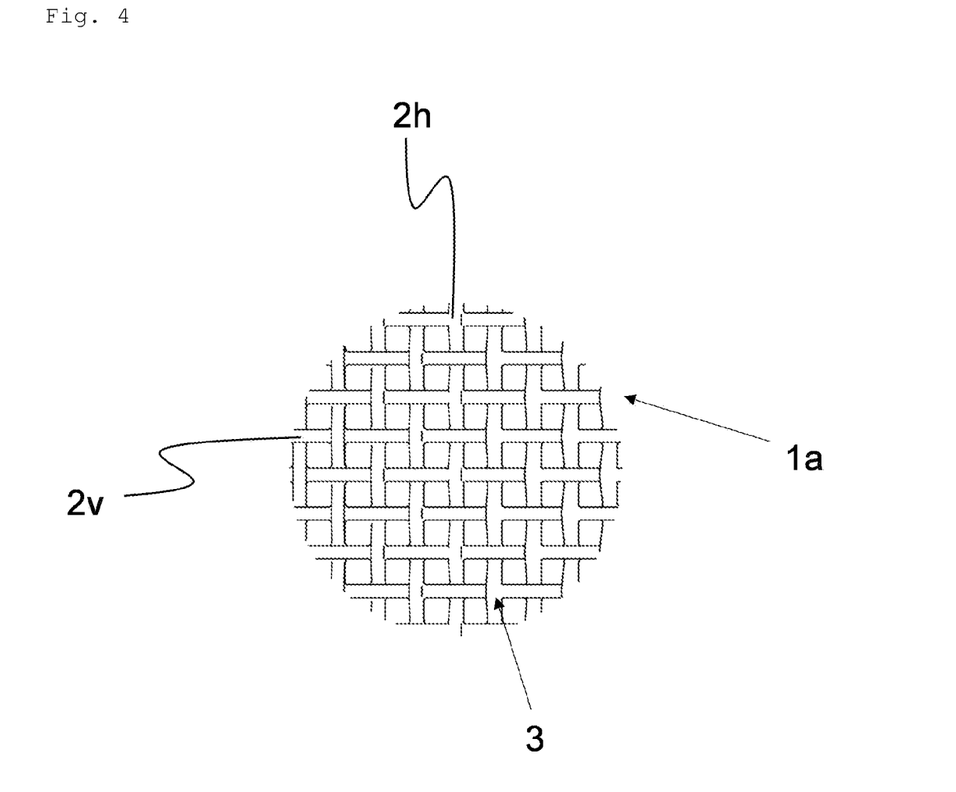
FIG. 4 shows a horizontal or vertical grid structure, respectively.

FIG. 3 shows the rear view of a grid flap with crossing points 3 according to FIG. 2. Herein, it becomes clear again that the entire grid structure 1a is formed of one piece. FIG. 4 shows a certain orientation of the grid structure 1a. In this case, the grid structure 1a resembles a wickerwork or fabric. The struts 2h and 2v are substantially aligned rectangular to each other.

Figure 5:
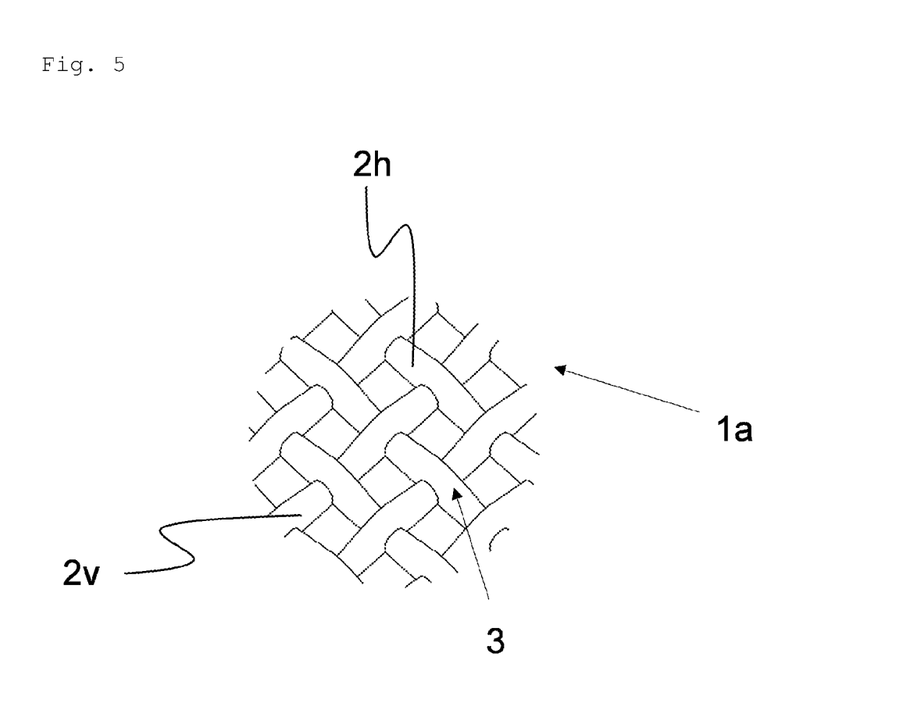
FIG. 5 shows a grid structure rotated by 45°.

FIG. 5 shows another, also substantially perpendicular design of the struts 2h and 2v of the grid structure 1a. From this, it is also visible that the crossing points 3 are designed of one piece, and hence, no double areas are present in this case.

Figure 6:
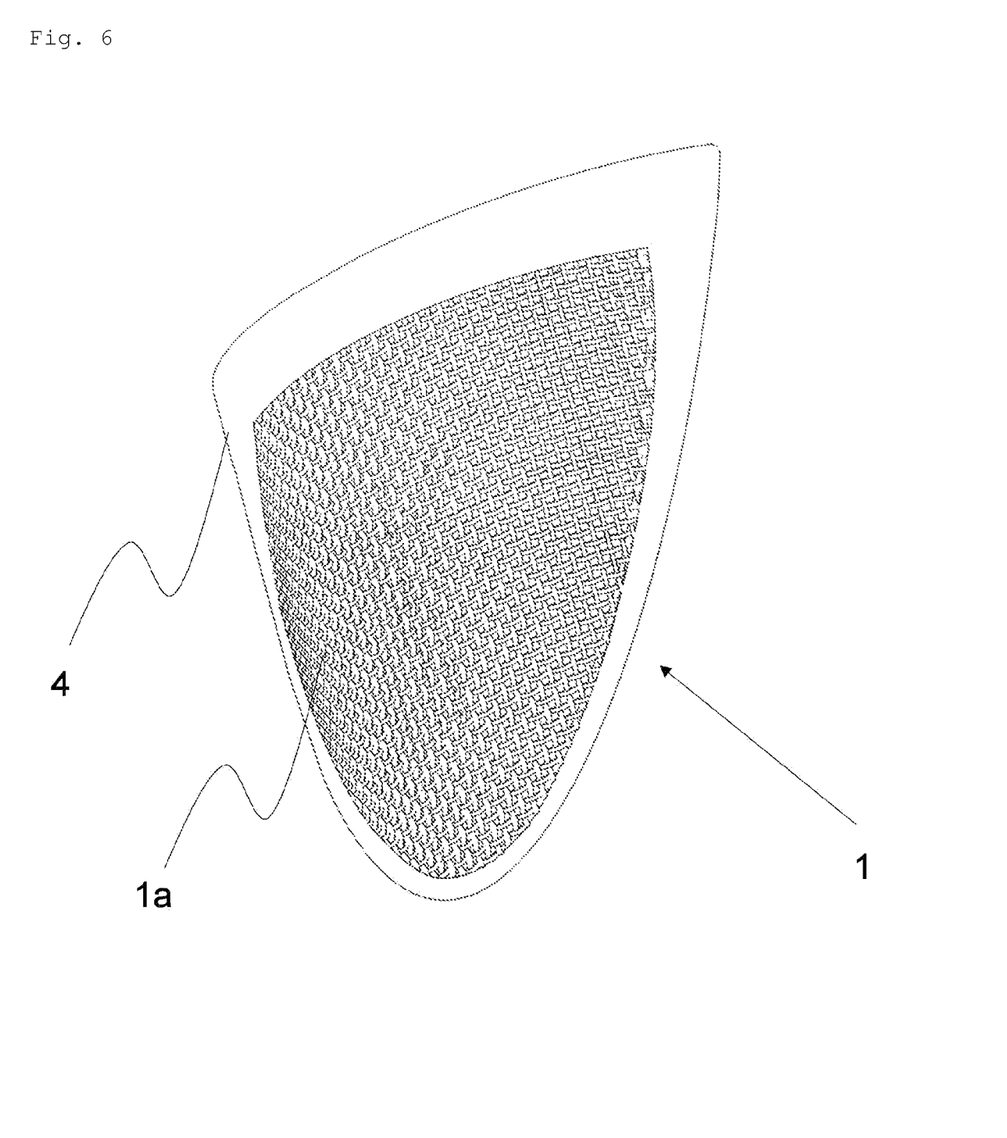
FIG. 6 shows a grid flap according to the invention, wherein the grid structure is approximated to a cylindrical area.

FIG. 6 shows a particularly advantageous embodiment of a grid flap 1, wherein the grid flap 1 is approximated to a cylindrical area. The curvature radius of the flap area of the upper part to the lower part is variable, but can also remain almost constant.

Also from this, it becomes visible that the grid structure 1a makes a transition to the frame 4 in a seamless manner.

Figure 7:
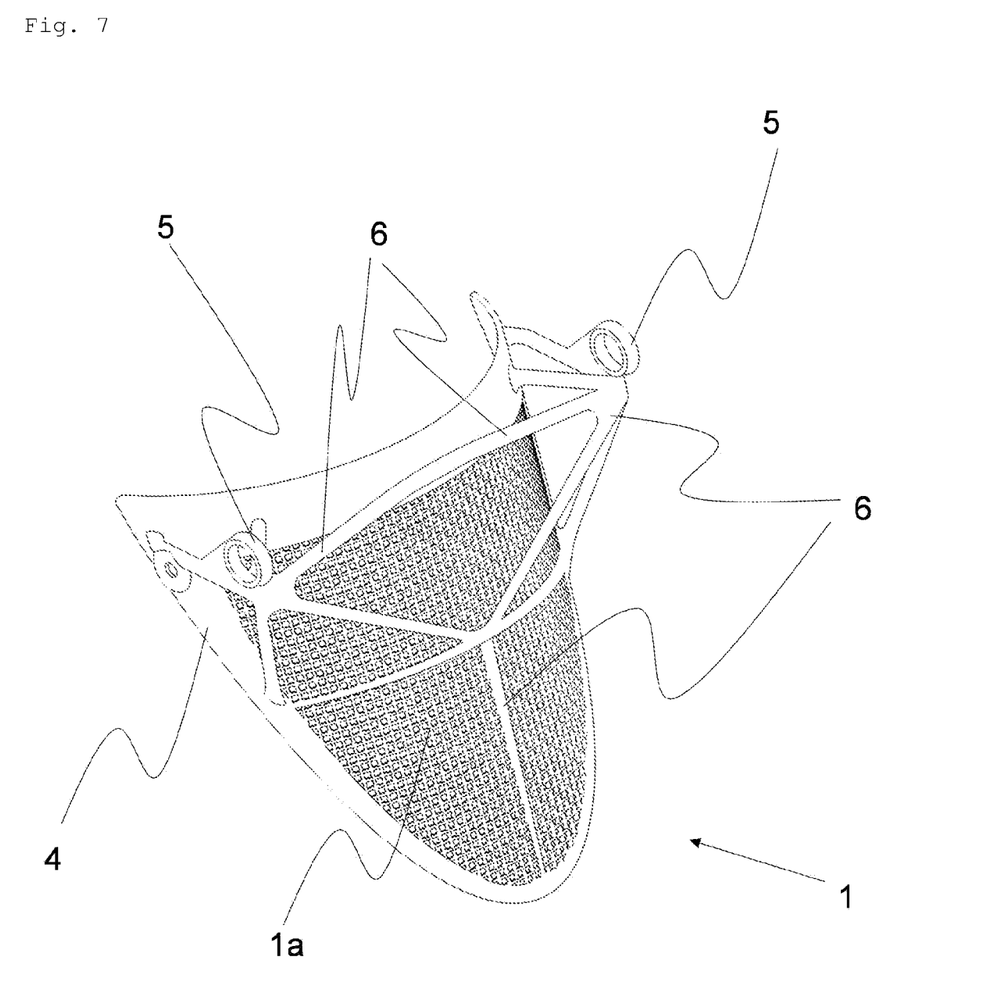
FIG. 7 shows a grid flap according to FIG. 6, however including a connection structure and bearings.

FIG. 7 shows a light weight construction connecting structure of the grid flap 1 of FIG. 6, for which a transmission of forces to the bearings 5 occurs directly. Furthermore, it becomes visible that no supporting construction for the grid 1a becomes necessary, but only single strengthening struts 6, which, however, are also bendable in the cylindrical shape of the grid flap 1 without any problems.

Also from this, it becomes visible that the grid structure 1a makes a transition to the frame 4 in a seamless manner.

Figure 8:
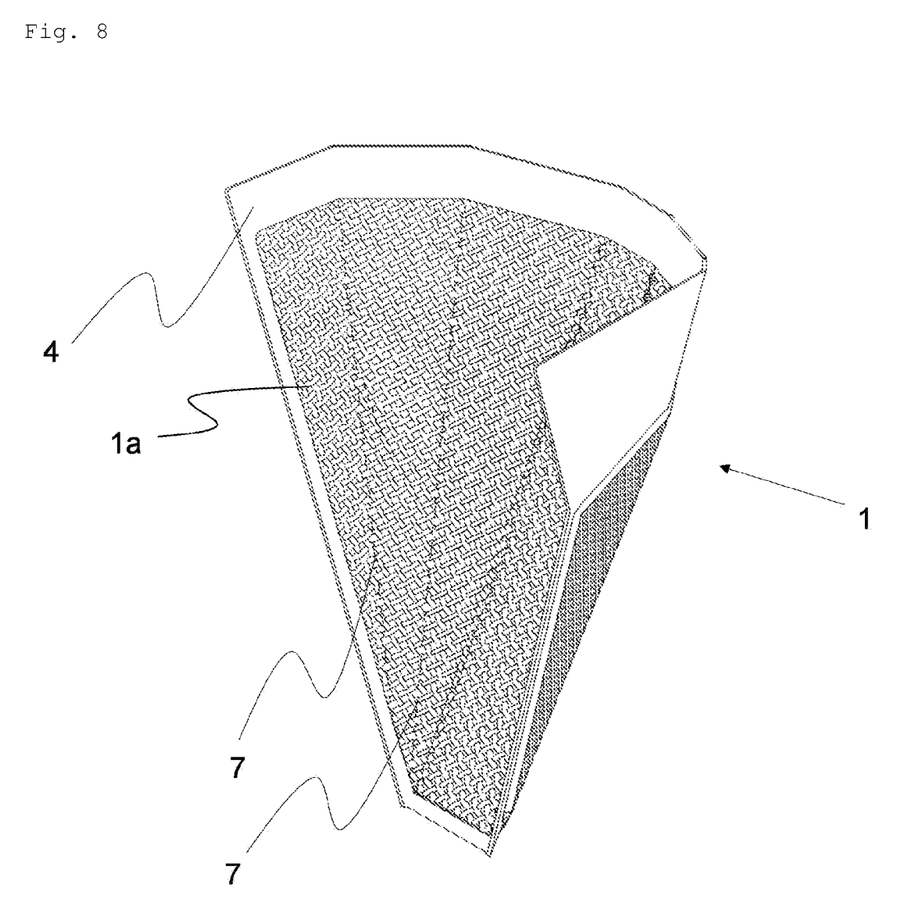
FIG. 8 shows a grid flap according to the invention which is approximated to a flap area with edges.

In FIG. 8 a further, particularly advantageous embodiment of the grid flap 1 is presented, wherein here, the grid flap 1 is approximated to the shape of a metal flap with edges. The grid structure 1a comprises several edges 7, wherein grid 1a and frame 4 are still formed of one piece.

The circumferential surface of the grid flap 1 herein describes the shape of a pyramid with an n-edge as base area.

Figure 9:
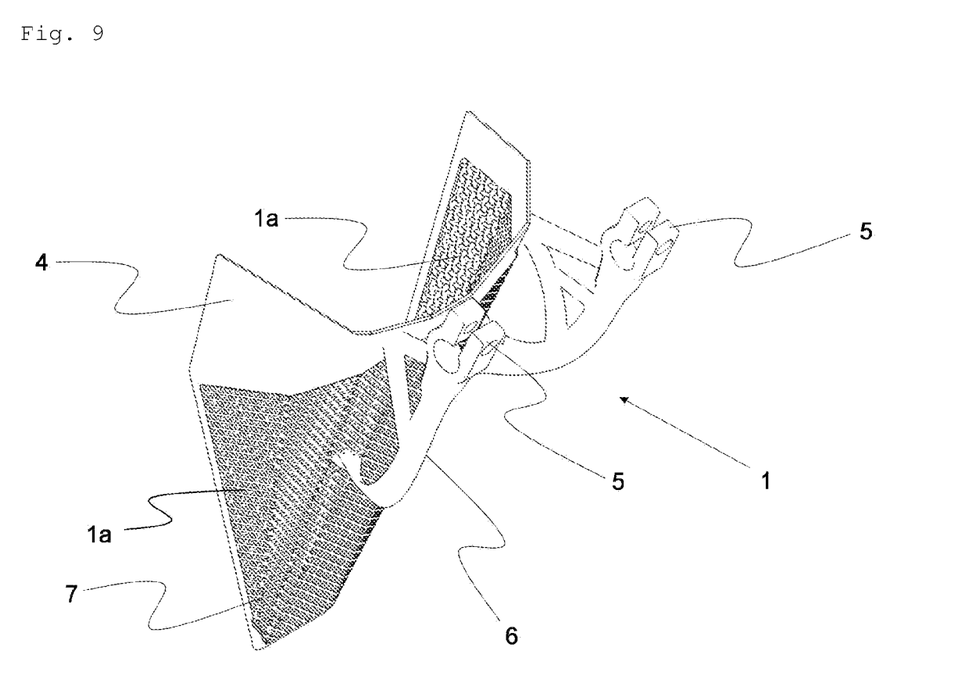
FIG. 9 shows a grid flap according to FIG. 8, however including a connection structure and bearings.

FIG. 9 shows the connecting structure of the grid flap from FIG. 8, with which a transmission of forces from the bearings 5 via strengthening struts 6 directly to the grid flap 1 is enabled. The transition from grid 1a to the connecting structure 6 is herein hygieni-cally designed and made of one piece, without cavities or double areas. Despite all is-sues, the grid is self-supporting and can distribute forces onto the flap without the risk of a deflection. The grid structure 1a comprises several edges 7 also in this case, wherein grid 1a and frame 4 are still made of one piece.

The present invention is not limited to the above-mentioned embodiments.

The orientation of the grid structure can vary depending on the product and can be provided in a different way in the scope of the present invention. Herein, in particular the individual cleanability, the size of the product, the product shape and the desired clearing characteristics play a role. The grid struts 2v and 2h do not have to be connected in a perpendicular manner at the crossing points; rather, a web-shape or a weave-shape can be present. Furthermore, a shape which is usual for knittings is possible. Furthermore, different structures, for example, meshes, which can be fabricated via knitting and crocheting, etc. are possible.

Furthermore, the shape of the grid flap is not limited to the above-mentioned embodiments. Furthermore, cone shapes, spherical segment shapes, prism shapes and rectangular shapes are possible.

The invention claimed is:

1. A grid flap, comprising:
    a multiplicity of vertical and horizontal grid struts,
    a frame, which surrounds the grid struts, and
    at least one strengthening strut integrated in the frame by which forces applied to bearings, from which the grid flap can be supported, are transmitted to the grid flap,
    wherein the vertical and horizontal grid struts overlap in crossing points characterized in that the crossing points of the grid struts are made of one piece, and connection of the grid struts to the frame is formed in a flush manner, wherein the multiplicity of vertical and horizontal grid struts, the crossing points and the frame are made of one piece, the connection of the grid struts to the frame is formed as a steady transition and the grid flap has a radius of curvature such that the grid flap is non-planar.

2. A grid flap according to claim 1,
    wherein the vertical and horizontal grid struts at the crossing points are designed in a substantially perpendicular manner.

3. A grid flap according to claim 1,
    wherein the vertical and horizontal grid struts comprise a substantially mesh-like structure.

4. A grid flap according to claim 1,
wherein the grid flap describes a substantially cylindrical area.

5. A grid flap according to claim 4, wherein the radius of curvature of the grid flap is variable over the length of the grid flap.

6. A grip flap according to claim 4, wherein the radius of curvature of the grid flap is variable in at least one direction.

7. A grip flap according to claim 6, wherein a radius of curvature of an upper part of the grid flap is variable to a radius of curvature of a lower part of the grid flap.

8. A grid flap according to claim 1, wherein the grid flap has an n-edged shape.

9. A grid flap according to claim 1, wherein the grid flap is composed of several segments.

10. A grid flap according to claim 1, wherein the grid struts form a grid structure that comprises a plurality of edges.

* * * * *